Feb. 22, 1949. D. ORTLEB 2,462,768
PROTECTOR PAD
Filed Sept. 27, 1946

INVENTOR
DOUGLAS ORTLEB
BY
ATTORNEY

Patented Feb. 22, 1949

2,462,768

UNITED STATES PATENT OFFICE 2,462,768

PROTECTOR PAD

Douglas Ortleb, St. Louis, Mo.

Application September 27, 1946, Serial No. 699,910

2 Claims. (Cl. 155—198)

This invention relates to protector pads, and especially pads intended for use at the window of an automobile where the driver often rests his left arm on the frame. All drivers have experienced the discomfort of resting an arm directly on the frame, which is particularly unpleasant in hot weather, and the principal object of this invention is to provide a covering, or pad, which can be secured in place on the frame where the driver's arm rests so that a portion of the pad will depend from the frame both inside and outside of the automobile when the window is open, the pad being retained on the frame in such a way that it need not be removed therefrom when the window is closed, and at the same time will not interfere with the up or down movement of the window glass.

Other advantages of my protector pad are that it can be made of plastic or other waterproof material, or of any fabric if preferred, and it is of such simple construction that it may be inexpensively produced. Also, it may be installed without the use of any tools, and once in position its construction is such as to prevent its accidental displacement.

In the drawings—

Figure 1:
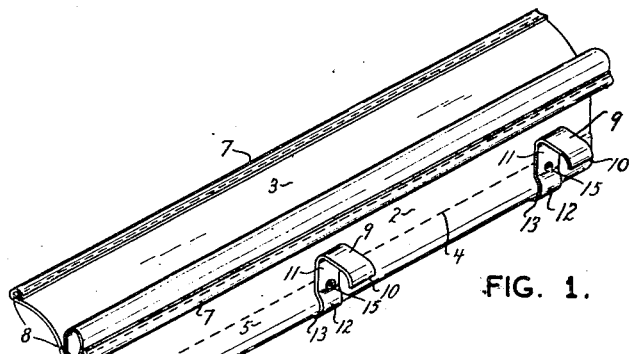
Fig. 1 is a perspective of my protector pad in which the means for attaching it to the window-frame is particularly illustrated.
Figure 2:
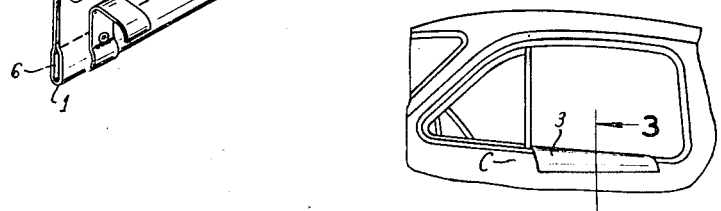
Fig. 2 illustrates an open window of an automobile on a reduced scale, with my protector pad in operative position thereon.

The invention comprises a rectangular section of material, preferably plastic or other waterproof material though it may be any fabric, which is folded longitudinally, as at 1, into two sections 2 and 3, respectively. The fold 1 does not come at the exact longitudinal center of the material, so that the section 3 is slightly longer than the section 2. The sections 2 and 3 are secured to each other by a row of stitching 4, which is spaced a slight distance away from the fold 1, to form a casing 5 into which a stiffening member 6 is inserted. At their free longitudinal edges the sections 2 and 3 are provided with hems 7, and a rod 8 is inserted into each of the hems 7 to serve both as a stiffening member and as a weight to hold the sections 2 and 3 steady when in operative position.

Figure 3:
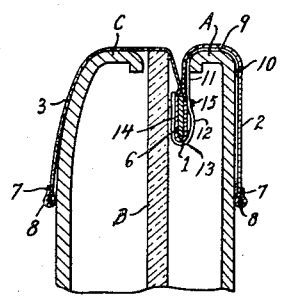
Fig. 3 is an enlarged cross-sectional view taken on the line 3—3, Fig. 2.

A plurality of fasteners in the form of spring metal retaining members is attached to the device at intervals along the fold 1 to hold the pad in position on the window frame. Each of these members preferably is formed of a single length of the spring metal having a horizontal portion 9 of such dimensions as to equal approximately the thickness of the ordinary automobile window frame, the horizontal portion 9 terminating at one side in a slightly downturned end, as shown at 10. At the opposite side of the portion 9 the spring metal is bent down to form a vertical portion 11 which is bulged out, as shown at 12, and then bent upwardly, as at 13, to form an upward extension 14. The casing 5, with the stiffening member 6 therein, is slipped between the portions 12 and 14 of the retaining members (Figs. 3 and 4), and the parts are rigidly secured together by rivets 15 which pass through the portions 12, the casing 5, the stiffening member 6, and the portion 14 of the respective retaining members.

Figure 4:
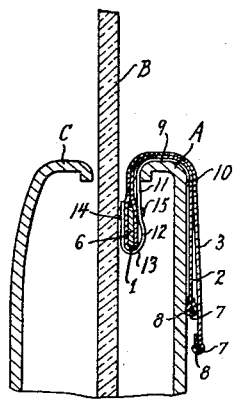
Fig. 4 is an enlarged cross-sectional view illustrating my protector pad in position with the automobile window closed.

In operation the procedure is as follows: Suppose the automobile window is closed, as shown in Fig. 4. Both the sections 2 and 3 are draped over the horizontal portions 9 of the retaining members so that the longer section 3 is positioned above the section 2. The bulging portion 12 of each retaining member is pushed down between the window frame A and the glass pane B of the automobile until the horizontal portion 9 comes to rest on the surface of said frame. By reason of its resiliency, it is possible to push the bulging portion 12 through the space between the window frame and the glass, and when the retaining member has been placed in position as above described the window frame will be located between the portion 11 and the downturned end 10 of the retaining member, which will be held in position by virtue of the bulged out portion 12, which will prevent accidental displacement of the retaining member from this position. The protector pad is now in the position shown in Fig. 3, where the driver may rest his arm on the double thickness of the sections 2 and 3 while driving.

Now suppose the window is to be opened. The extension 14 of the retaining member is adjacent to but slightly spaced away from the glass pane B, so that the pane may be lowered without interference. When it has been lowered to the position shown in Fig. 3, the longer section 3 is grasped by its rod 8 and thrown outwardly across the window opening in the door C of the car, so that it will assume the position shown in Fig. 3. Also, the slight space between the window pane and the retaining member prevents any displacement of the retaining member by the movement of the glass pane B. Obviously, the entire portion of the window opening where the driver rests his arm is now covered by the sections 2 and 3 of the protector pad, and should the driver push his elbow outside of the car his arm will still be resting on these sections.

When it is desired to close the window, it is necessary only to draw in the section 3 of the protector pad and drop it over the section 2, and the device will offer no resistance to the movement of the pane B. The slightly greater length of the section 3 is for the driver's convenience in picking up this section when he wishes to position it outside the car.

From the above description it will be understood that whether the car window is open or closed, the driver may constantly avail himself of the comfort afforded by the protector pad, and the change of the pad from use in closed to open window, or the reverse, can be affected with the minimum of effort while driving.

I claim:

1. A protector pad for use in an automobile window or the like, comprising a length of material folded to provide a pair of sections adapted to be positioned on the frame of said window between said frame and the driver's arm, a stiffening member between said sections and adjacent the fold thereof, and resilient retaining means rigidly secured to said stiffening member, said retaining means including a horizontal element adapted to rest upon the frame of said window and a vertical element provided with a bulge which is capable of compression to permit insertion of said vertical element between the frame and the glass of said window but prevents accidental withdrawal therefrom, and said retaining means being incapable of offering interference to the raising or lowering of the glass of said window.

2. A protector pad for use in an automobile window or the like, comprising a length of material folded to provide a pair of sections adapted to be positioned on the frame of said window between said frame and the driver's arm when said window is in either open or closed position, a stiffening member between said sections and adjacent the fold thereof, and resilient retaining means rigidly secured to said stiffening member, said retaining means including a horizontal element adapted to rest upon the frame of said window and a vertical element provided with a bulge which is capable of compression to permit insertion of said vertical element between the frame and the glass of said window but prevents accidental withdrawal therefrom, and said retaining means being incapable of offering interference to the raising or lowering of the glass of said window.

DOUGLAS ORTLEB.

REFERENCES CITED

The following references are of record in the file of this patent:

UNITED STATES PATENTS

| Number | Name | Date |
| --- | --- | --- |
| 1,674,205 | Johnson | June 19, 1928 |
| 1,809,292 | Fry | June 9, 1931 |
| 1,962,508 | Josselyn | June 12, 1934 |
| 2,109,652 | Sallop et al. | Mar. 1, 1938 |
| 2,274,026 | Allen | Feb. 24, 1942 |